No. 810,413. PATENTED JAN. 23, 1906.
F. W. HOVEY.
MANURE SPREADER.
APPLICATION FILED JAN. 3, 1905.
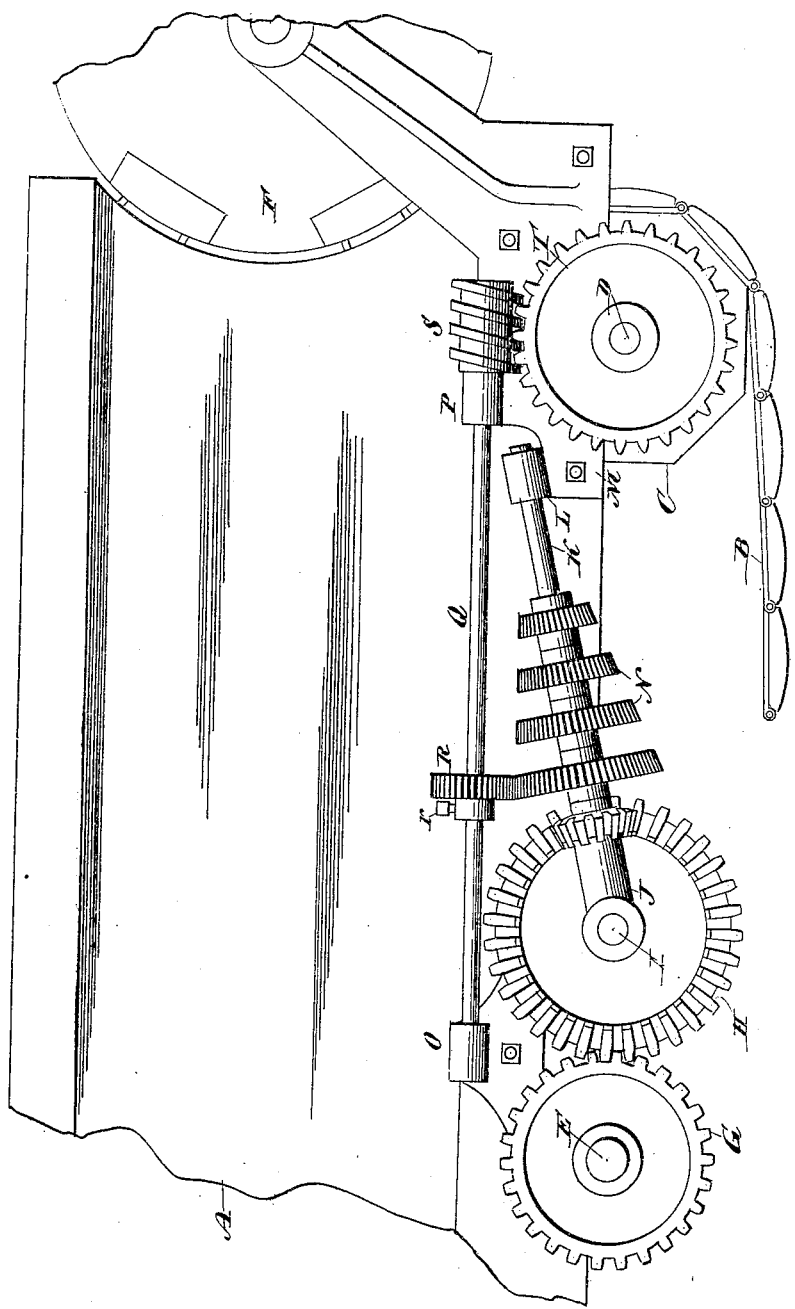

UNITED STATES PATENT OFFICE.

FRANK W. HOVEY, OF INDEPENDENCE, IOWA.

MANURE-SPREADER.

No. 810,413. Specification of Letters Patent. Patented Jan. 23, 1906.

Application filed January 3, 1905. Serial No. 239,317.

*To all whom it may concern:*

Be it known that I, FRANK W. HOVEY, a citizen of the United States, residing at Independence, in the county of Buchanan and State of Iowa, have invented certain new and useful Improvements in Manure-Spreaders, of which the following is a specification.

This invention relates more particularly to the gearing which drives the apron of manure-spreaders, and has for its object to produce a feed-drive for such machines which is positive and powerful and adapted to such variations as to give any desired spread of said material on the ground.

The nature of the invention will fully appear from the description and claim following, reference being had to the accompanying drawing, in which is shown a side elevation of a part of the rear end of a manure-spreader with my improved gear attached thereto.

In the drawing, A designates the body or box of a manure-spreader of a familiar type, the bottom of which is an apron B, suitably moved forward and backward, as by a polygonal wheel C on a shaft D. The body is mounted on a rear axle E, driven by a supporting or traction wheel. (Not shown.) The parts at the other end of the machine are not necessary to a complete understanding of this invention. The distributing-cylinder F is mounted at the open rear end in the usual way.

Secured to the rear axle E is a gear G, meshing with a compound spur and bevel gear H, which turns on a stud I. On the same stud is mounted a bearing J for one end of a shaft K, the other end having a bearing L in a casting M. On this diagonal shaft is mounted a series of gears N, varying in size, so that their upper faces are practically horizontal, as shown. Parallel with these faces and journaled in bearings O and P is a shaft Q, carrying an adjustable pinion R, which may be secured at any desired point along the shaft, as by a set-screw r. The pinion may thus be slid to mesh with any gear on the inclined shaft at will and secured in mesh therewith. To the rear end of the shaft Q is secured a worm S, which engages a worm-gear T on the shaft D.

This construction is adapted to impart a positive, uniform, and steady feed, so that the manure is spread evenly on the ground. The quantity is varied by simply shifting the pinion R to mesh with any desired gear on the diagonal shaft.

Having thus described my invention, what I claim as new, and desire to secure by Letters Patent, is—

The described drive mechanism for a manure-spreader, embracing, in combination with the feed-apron and its carrying-shaft and sprockets, a worm-gear attached to said shaft, a worm engaging the same, a horizontal shaft for the worm, with a slidable and adjustable spur-pinion mounted thereon, an inclined shaft with differential spur-pinions mounted thereon, a bevel-pinion on said shaft, a bevel-gear engaging said bevel-pinion, a gear engaging said bevel-gear and carried by one of the traction-wheels, a casting adjacent to said gears forming a bearing for one end of the horizontal shaft, a bearing mounted on the bevel-gear stud to take one end of the inclined shaft, and a casting having horizontal and inclined bearings for the corresponding shafts at one end, all substantially as described.

In testimony whereof I affix my signature in presence of two witnesses.

FRANK W. HOVEY.

Witnesses:
M. A. SMITH,
W. T. JONES.